US010544738B2

(12) United States Patent
Moravek et al.

(10) Patent No.: US 10,544,738 B2
(45) Date of Patent: Jan. 28, 2020

(54) ENERGY SCAVENGING HEALTH MONITORS FOR AIRCRAFT AND OTHER VEHICLES

(71) Applicant: HONEYWELL INTERNATIONAL INC., Morris Plains, NJ (US)

(72) Inventors: Patrik Moravek, Brno (CZ); Ondrej Kotaba, Moravia (CZ); Petr Spanel, Ceska (CZ); Dinkar Mylaraswamy, Fridley, MN (US); Ramon Blanco Encinas, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 99 days.

(21) Appl. No.: 15/797,112

(22) Filed: Oct. 30, 2017

(65) Prior Publication Data
US 2019/0128191 A1    May 2, 2019

(51) Int. Cl.
*B64D 45/00*    (2006.01)
*F01D 21/00*    (2006.01)
(Continued)

(52) U.S. Cl.
CPC .............. *F02C 7/275* (2013.01); *B64D 45/00* (2013.01); *F01D 21/003* (2013.01); *F02C 7/277* (2013.01);
(Continued)

(58) Field of Classification Search
CPC . F02C 7/275; F02C 7/277; F02C 9/00; H02K 11/35; H02K 7/1823; H02K 1/246;
(Continued)

(56) References Cited

U.S. PATENT DOCUMENTS 7,256,505 B2    8/2007    Arms et al.
7,719,416 B2    5/2010    Arms et al.
(Continued)

FOREIGN PATENT DOCUMENTS

EP    2514949 A2    10/2012

OTHER PUBLICATIONS

European Patent Office, European Extended Search Report for Application No. 18203224 dated Mar. 27, 2019.

*Primary Examiner* — Jelani A Smith
*Assistant Examiner* — Kelly D Williams
(74) *Attorney, Agent, or Firm* — Lorenz & Kopf, LLP (57) ABSTRACT

Energy scavenging health monitors are provided for assessing the health of components onboard aircraft and other vehicles, as are methods carried-out by energy scavenging health monitors. In various embodiments, the energy scavenging health monitor includes an energy scavenger system, a controller coupled to the energy scavenger system, and a first sensor coupled to the controller. During operation of the health monitor, the first sensor provides sensor signals to the controller, which are indicative of an operational parameter pertaining to a monitored device of the vehicle. Storage media contains computer-readable instructions, which when executed by the controller, cause the energy scavenging health monitor to determine when a predetermined trigger event has occurred based, at least in part, on electrical input signals received from the energy scavenger system. In response to occurrence of the predetermined trigger event, the controller further stores data indicative of the sensor signals in the storage media.

14 Claims, 3 Drawing Sheets

(51) Int. Cl.
*F02C 7/275* (2006.01)
*F02C 7/277* (2006.01)
*F02C 9/00* (2006.01)
*G07C 5/08* (2006.01)
*H02K 1/14* (2006.01)
*H02K 1/24* (2006.01)
*H02K 11/21* (2016.01)
*H02K 11/35* (2016.01)
*H02K 7/18* (2006.01)
*H02P 9/08* (2006.01)
*H02P 101/25* (2016.01)

(52) U.S. Cl.
CPC ............... *F02C 9/00* (2013.01); *G07C 5/085* (2013.01); *H02K 1/14* (2013.01); *H02K 1/246* (2013.01); *H02K 7/1823* (2013.01); *H02K 11/21* (2016.01); *H02K 11/35* (2016.01); *H02P 9/08* (2013.01); *B64D 2045/0085* (2013.01); *F05D 2220/76* (2013.01); *F05D 2260/4031* (2013.01); *F05D 2260/42* (2013.01); *F05D 2260/60* (2013.01); *F05D 2260/76* (2013.01); *F05D 2260/80* (2013.01); *H02P 2101/25* (2015.01)

(58) Field of Classification Search
CPC .......... H02K 1/14; H02K 11/21; B64D 45/00; B64D 2045/0085; H02P 9/08; H02P 2101/25; F01D 21/003; G07C 5/085; F05D 2260/76; F05D 2260/60; F05D 2260/80; F05D 2260/4031; F05D 2260/42; F05D 2220/76
See application file for complete search history.

(56) References Cited

U.S. PATENT DOCUMENTS

| | | |
|---|---|---|
| 8,011,255 B2 | 9/2011 | Arms et al. |
| 9,507,982 B2 | 11/2016 | Mylaraswamy et al. |
| 2009/0240604 A1* | 9/2009 | Thurston .............. G06Q 10/087 705/29 |
| 2012/0143436 A1 | 6/2012 | Cornet et al. |
| 2012/0293115 A1* | 11/2012 | Ramsesh .............. G01D 5/2013 320/108 |
| 2016/0196457 A1* | 7/2016 | Mylaraswamy ........ H04W 4/80 340/10.1 |

* cited by examiner

ENERGY SCAVENGING HEALTH MONITORS FOR AIRCRAFT AND OTHER VEHICLES

TECHNICAL FIELD

The following disclosure relates generally to health monitoring of vehicular components and, more particularly, to energy scavenging health monitors for gathering data pertaining to the health of components onboard aircraft and other vehicles, as well as to methods carried-out by energy scavenging health monitors.

ABBREVIATIONS

Abbreviations appearing less frequently in this document are defined upon initial usage, while abbreviations appearing with greater frequency are defined below.
A/C—Aircraft;
AGB—Accessory Gearbox;
ATS—Air Turbine Starter;
ATSS—Air Turbine Starter System;
GTE—Gas Turbine Engine;
LRU—Line Replaceable Unit;
MES—Main Engine Start; and
SAV—Starter Air Valve.

BACKGROUND

It is often desirable to monitor the health of vehicular components for diagnostic and prognostic purposes. In the case of an A/C, specifically, it may be beneficial to monitor the health of components dedicated to vital A/C functions to allow such components to be replaced preemptively or efficiently repaired when appropriate. Consider, for example, an ATSS of the type utilized to initiate MES of one or more air-started GTEs carried by an A/C. An unplanned maintenance event may occur if the GTE responds sluggishly or fails to respond during MES due to, for example, a failure occurring within the SAV, ATS, or other ATSS component. In such an instance, a technician may be dispatched to address the unplanned maintenance event. By monitoring the health of the ATSS components, such components can often be rapidly replaced by the technician to restore proper A/C operation or, more preferably, preemptively replaced to avoid or preempt occurrence of the unplanned maintenance event. Such components are also typically implemented as Line Replaceable Units or "LRUs" to further facilitate rapid in-line replacement without removal of the A/C from service.

Certain devices or "nodes" for monitoring the health of A/C components, particularly those components implemented as avionic LRUs, are set-forth in U.S. Pat. No. 9,507,982 B2. While health monitoring devices of this type are highly useful, customer adoption of such devices has been hampered by limitations related to power supply. Rarely is there provided dedicated leads or terminals on larger A/C components or systems for powering such health monitoring devices. Integration of health monitor devices can thus be burdensome or cumbersome from a customer installation standpoint and may require additional device certification. Further, while certain power harvesting schemes have been suggested for easing integration of health monitoring devices, such power harvesting schemes are often difficult or impractical to implement in practice and may be insufficient to adequately power the health monitor electronics. As a still further challenge, existing health monitors commonly rely exclusively upon rechargeable chemistry batteries or similar energy storage means, the stored energy content of which tends to dissipate over time. As a result, such energy storage means may fail to retain adequate energy content to initially power the health monitor electronics upon startup, which can compromise the timing and integrity of data collection in certain instances.

There thus exists an ongoing demand for health monitoring devices capable of reliability collecting data pertaining to the health of components deployed onboard A/C and other vehicles, while overcoming the drawbacks listed above. There exists a particular demand for provide health monitor devices or, more simply, "health monitors" having improved energy scavenging capabilities, while ensuring reliable data collection and possible data analysis or component health evaluation in the absence of a dedicated power supply. Embodiments of such energy scavenging health monitors are described herein, as are methods usefully performed by such health monitors. Other desirable features and characteristics of the present invention will become apparent from the subsequent Detailed Description and the appended Claims, taken in conjunction with the accompanying Drawings and the foregoing Background.

BRIEF SUMMARY

Energy scavenging health monitors are provided for gathering data pertaining to and possibly assessing the health of components onboard A/C and other vehicles. In various embodiments, the energy scavenging health monitor includes an energy scavenger system; a controller, such as a microprocessor, coupled to the energy scavenger system; and at least a first sensor coupled to the controller. During operation of the health monitor, the first sensor provides sensor signals to the controller, which are indicative of an operational parameter pertaining to a monitored device of the vehicle. Storage media contains computer-readable code or instructions, which when executed by the controller, cause the energy scavenging health monitor to determine when a predetermined trigger event has occurred based, at least in part, on electrical input signals received from the energy scavenger system. Following occurrence of the predetermined trigger event, the controller further stores data indicative of the sensor signals in the storage media. In certain implementations, the energy scavenging system may include one or both of: (i) an electrical tap line connection configured to extract energy from command signals transmitted to the monitored device, and (ii) a rotary reluctance generator configured to harvest power from rotation of driven component.

In other embodiments, the energy scavenging health monitor includes a first sensor for monitoring an operational parameter pertaining to a monitored device contained within a vehicle, such as an SAV or ATS contained within an ATSS deployed onboard an A/C. A controller is coupled to the first sensor and is configured to store health data derived from signals received from the first sensor within a computer-readable memory or storage media. The energy scavenging health monitor further contains an energy scavenger system, which includes a rotary reluctance generator and at least one energy storage mechanism, such as a supercapacitor and/or a rechargeable chemistry battery. The rotary reluctance generator is configured to harvest energy from rotation of a driven component of the vehicle, such as a gearwheel contained in an ATS. The energy storage mechanism is coupled to controller and is configured to store the energy harvested by the rotary reluctance generator, which is, in turn, utilized to selectively power the health monitor electronics.

Methods carried-out by an energy scavenging health monitor are further provided. In embodiments, the method includes the step or process of harvesting energy from a rotating component of an ATS utilizing a rotary reluctance generator, which is contained within the energy scavenging health monitor. Signals are received at a controller, which is further contained within the health monitor. The signals are transmitted from the rotary reluctance generator, and are processed by the controller to detect rotational speeds of the rotating component. Data indicative of the detected rotational speeds of the rotating component is then stored in a memory or storage media of the health monitor. Energy may be extracted from command signals supplied to a switch of an SAV fluidly coupled to the ATS, and the extracted energy may be utilized in powering the energy scavenging health monitor in some implementations. In such implementations. In certain implementations, the method may further includes the steps or processes of: (i) storing the energy harvested from the rotating component in an energy storage mechanism further contained in the energy scavenging health monitor; (ii) powering the energy scavenging health monitor primarily utilizing energy extracted from the command signals during an initial startup phase of the energy scavenging health monitor; and (iii) after the initial startup phase of the energy scavenging health monitor, transitioning to powering the energy scavenging health monitor primarily utilizing energy supplied by the energy storage mechanism.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

Energy harvesting health monitors are provided, which can operate in the absence of a dedicated power supply to gather and possibly evaluate health data pertaining to one or more monitored devices located onboard a vehicle. The data gathered by the energy harvesting health monitors can be processed to carry-out diagnostic or predictive algorithms, which are utilized to evaluate or assess component health for diagnostic or prognostic purposes. Such algorithms can be performed by the energy harvesting health monitor itself; or, perhaps, by another system, device, or module to which the health monitor avails its collected data. Embodiments of the energy harvesting health monitors are particularly well-suited for usage onboard A/C in monitoring the health of certain components vital to A/C operation, such as the components of an ATSS utilized to initiate MES of air-started GTEs. For this reason, embodiments of the energy scavenging health monitors are primarily discussed below in this exemplary context. This notwithstanding, it is emphasized that alternative embodiments of the energy scavenging health monitors can be utilized in conjunction with other components onboard fixed wing and rotary wing A/C, as well as other types of vehicles generally. Broadly, then, embodiments of the energy scavenging health monitor can be utilized to monitor and possibly evaluate the health of any number and type of vehicular components, particularly when it is impractical or inconvenient to provide a dedicated power supply to the health monitor itself.

Figure 1:
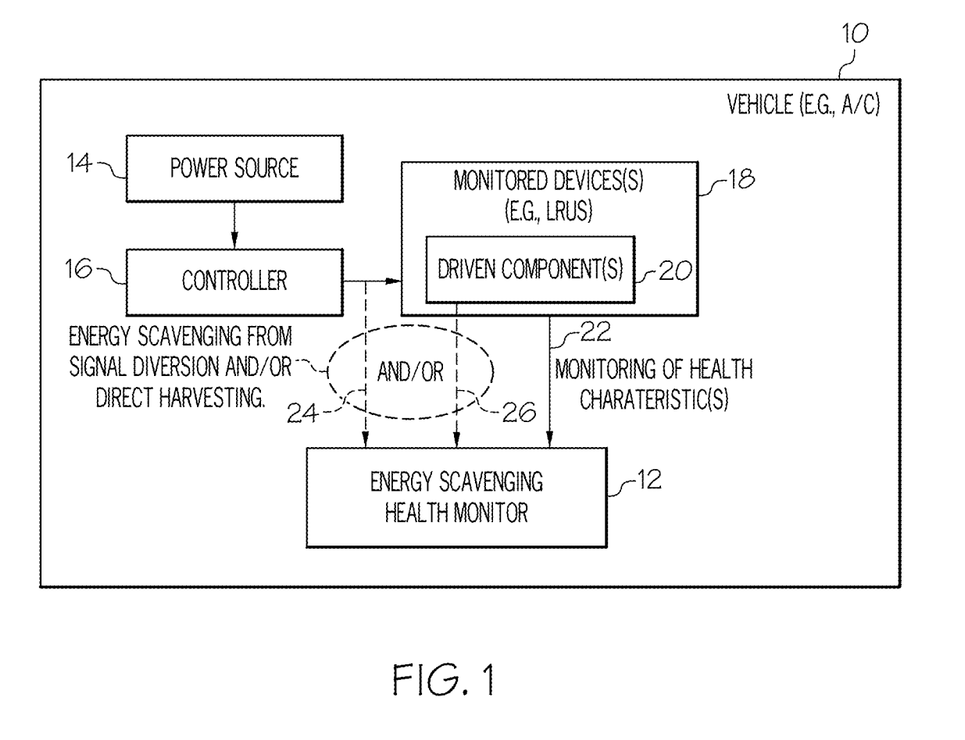
FIG. 1 schematically illustrates a vehicle, such as an A/C, equipped with an energy scavenging health monitor, as illustrated in accordance with an exemplary embodiment of the present disclosure.

FIG. 1 is a generalized schematic of a vehicle 10, such as an A/C, illustrated in accordance with an exemplary embodiment of the present disclosure. Vehicle 10 is usefully equipped with at least one energy scavenging health monitor 12, as discussed more fully below in conjunction with FIG. 2. In addition to health monitor 12, vehicle 10 includes a power source 14, a controller 16, and at least one monitored device 18. Device 18 is "monitored" in the sense that energy scavenging health monitor 12 tracks or monitors at least one characteristic or parameter pertaining to the health or operational status of device 18. Monitored device 18 may contain at least one driven component 20 from which health monitor 12 may derive or harvest power in at least some instances. In other embodiments, driven component 20 may be external to monitored device 18 or energy scavenging health monitor 12 may not derive power from component 20 and instead rely upon another source for scavenging power; e.g., in such embodiments, health monitor 12 may be powered exclusively by diverting a fraction of the current from electrical command signals transmitted from controller 16 to monitored device 18, as discussed below. Further, health monitor 12 can also potentially harvest energy indirectly from monitored device 18 or, more broadly, from vehicle 10 by, for example, converting vibration, temperature differentials, or other such byproducts of vehicular operation into energy utilizing suitable harvesting mechanisms in addition to or in lieu of those described below.

During operation of vehicle 10, controller 16 selectively transmits electrical command signals to monitored device 18 and, perhaps, controls the flow of electrical current from power source 14 to monitored device 18. In implementations in which vehicle 10 assumes the form of an A/C, power source 14 can be an electrical storage device (e.g. a battery) or a generator mounted to the AGB of a GTE carried by the A/C, such as a propulsive GTE, an Auxiliary Power Unit (APU), or a turboshaft GTE in the case of a rotary wing A/C. Further, in such embodiments, controller 16 may be an engine controller, such as a Full Authority Digital Engine Controller (FADEC), while monitored device 18 may be implemented as an avionic LRU. Finally, in many cases, driven component 20 will assume the form of a rotating component, such as a toothed gear or splined shaft, driven by rotation of an air turbine, such as air turbine 64 schematically shown in FIG. 2. In such embodiments, energy scavenging health monitor 12 is advantageously equipped with a rotary reluctance generator, which derives power from the rotating component and which may be further leveraged as a rotational speed sensor in at least some instances. An example of such a rotary reluctance generator is further described below in conjunction with FIGS. 3-4.

As indicated in FIG. 1 by connection 22, energy scavenging health monitor 12 tracks or monitors at least one parameter pertaining to the health or status of monitored device(s) 18. Energy scavenging health monitor 12 may record a history of such monitored health parameter(s) into an internal memory or computer-readable storage media. Additionally or alternatively, health monitor 12 may avail such health parameter data to another device or subsystem for storage or processing, such as a recording module in wireless communication with health monitor 12. Regardless of the particular location or locations at which the monitored health data is stored, such data may be subsequently accessed for diagnostic and prognostic purposes when desired. In certain embodiments, energy scavenging health monitor 12 may independently execute health diagnostic or prognostic algorithms to monitor and generate assessments of the health of monitored device 18; although this is not essential in all embodiments, again noting that health monitor 12 can serve merely as a data collection node in less complex implementations. When rendering top level health assessments through appropriate prognostic algorithms, health monitor 12 may store the top level health assessments in an internal memory or output such health assessments to other devices onboard or offboard vehicle 10 by, for example, wireless transmissions. Various different approaches for recording and processing health monitoring data are thus contemplated herein and remain within the scope of the present disclosure, noting that such approaches will vary amongst embodiments as will the particular types of data or health parameters tracked utilizing health monitor 12. Thus, while specific examples are provided below, such examples are provided by way of non-limiting illustration only.

As further indicated in FIG. 1 by connections 24, 26, embodiments of energy scavenging health monitor 12 may harvest energy or draw power in at least one of two manners. First, energy scavenging health monitor 12 may divert electric signals or other power supplied to monitored device, as indicated by "tap line" connection 24. Second, health monitor 12 may harvest or derive energy from rotation or other motion of driven component 20, as indicated by connection 26. These approaches are each associated with certain benefits and can be combined, if desired, in certain embodiments of health monitor 12. Similarly, energy scavenging health monitor 12 may contain one or more energy storage mechanisms, which may be selected based upon the particular energy scavenging approach employed by health monitor 12. For example, in certain implementations, energy scavenging health monitor 12 may contain a long term energy storage mechanism, such as a rechargeable chemistry battery; while, in other implementations, health monitor 12 may contain a short term energy storage mechanism, such as a supercapacitor. Energy scavenging health monitor 12 may contain both short and long term energy storage mechanism in certain instances, with the number and type of energy storage mechanism selected by design based upon the power demands of the health monitor electronics, the duration of time over which data is desirably collected when health monitor 12 is active, the intended application or mission requirements associated with a particular implementation of health monitor 12, and other such factors.

In various embodiments, energy scavenging health monitor 12 may be powered exclusively or primarily by diverting small amounts of power from electrical command signals transmitted to monitored device 18. In such embodiments, health monitor 12 may contain a short term energy storage mechanism (e.g., a supercapacitor) capable of storing a charge sufficient to allow brief instances of data recordation into the memory of health monitor 12 and/or another device in wireless communication with health monitor 12 following receipt of such command signals by device 18. Advantageously, health monitor 12 may be relatively non-complex and cost effective to implement in such embodiments. Conversely, in other embodiments, energy scavenging health monitor 12 may be powered exclusively or primarily by harvesting power from driven component 20 (e.g., a rotating shaft or gear), in which case health monitor 12 may include long term energy storage in the form, for example, a battery or battery bank having a rechargeable chemistry. Such embodiments may provide enhanced health monitoring and power availability, but with a corresponding tradeoff of increased complexity and cost. These two approaches can also be combined to yield still further embodiments of health monitor 12, which provide additional advantages as described below in conjunction with FIG. 2.

A principal usage envisioned for energy scavenging health monitor 12 pertains to monitoring the health of components contained within an ATSS, particularly an ATS and/or SAV, deployed onboard an A/C. As noted above, an ATSS is utilized to initiate MES of an air-started GTE and failure of the components contained within the ATSS may result an unplanned maintenance event, which can delay A/C takeoff and potentially result in flight cancellation. It is thus desirable to monitor the health of the ATS and SAV to facilitate repair and replacement during unplanned maintenance events, when they arise; or, more preferably, to allow such components to be preemptively replaced or repaired to avoid the occurrence of such unplanned maintenance events to the extent practical. For these reasons, and by way of non-limiting example only, a more specific embodiment of energy scavenging health monitor 12 will now be described in this context in conjunction with FIG. 2. The following example is encompassed by the overarching example shown in FIG. 1, with reference numeral "12" carried-over from FIG. 1 to FIG. 2 for consistency.

Figure 2:
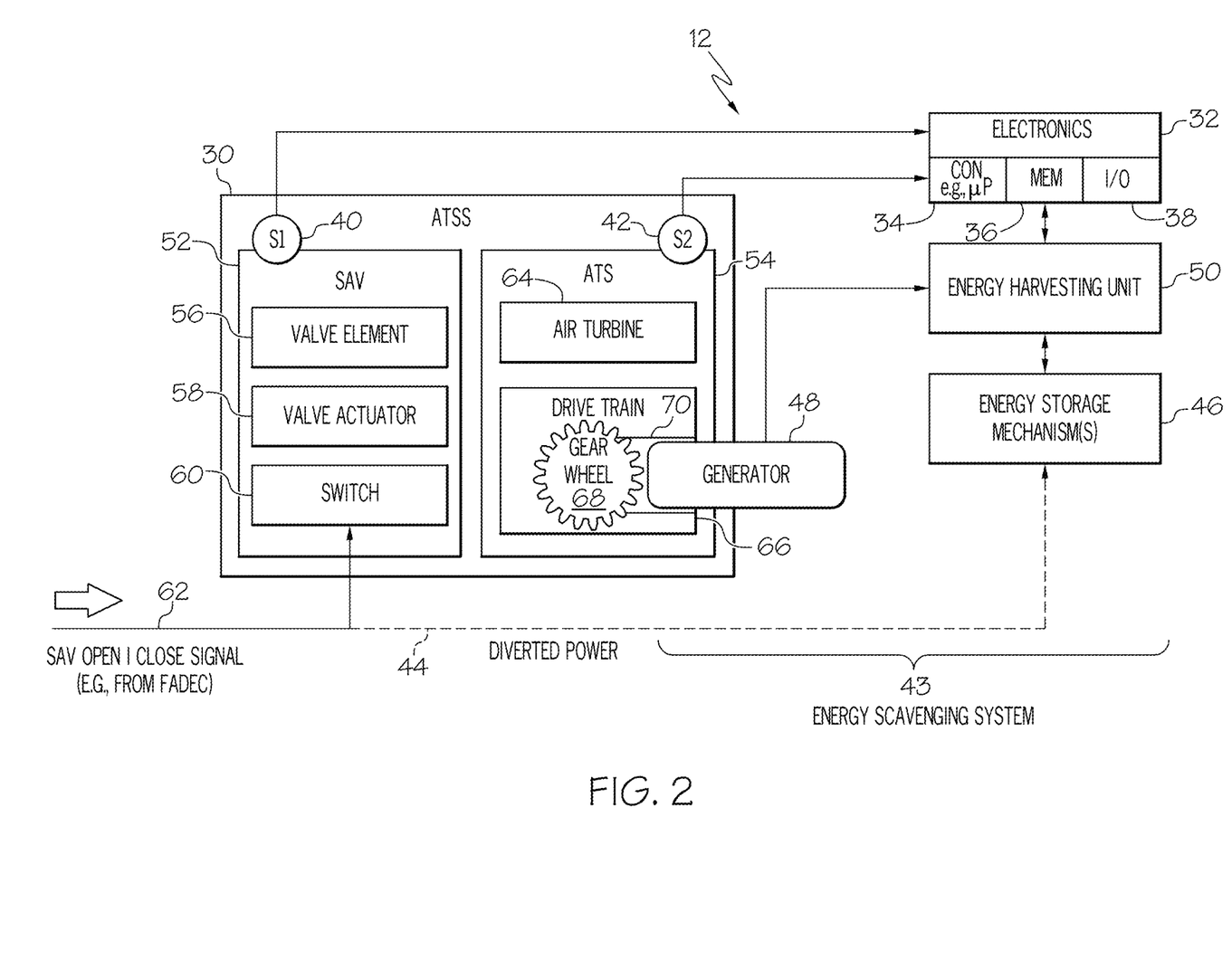
FIG. 2 further schematically illustrates the energy scavenging health monitor shown in FIG. 1 in an exemplary implementation in which the health monitor is utilized to gather data pertaining to and possibly perform algorithms assessing the health of components included within an ATSS deployed onboard an A/C.

FIG. 2 is a schematic of energy scavenging health monitor 12 in an exemplary implementation in which health monitor 12 is utilized to track one or more operational parameters pertaining to the components of an ATSS 30 and, perhaps, is further utilized to carry-out algorithms for repeatedly evaluating or assessing ATSS component health. As schematically illustrated in FIG. 2, energy scavenging health monitor 12 contains electronics 32 including a controller 34, memory 36, an input/output (I/O) interface 38, and one or more sensors 40, 42. Additionally, energy scavenging health monitor 12 contains an energy scavenging system 43, which is utilized to power electronics 32 in the absence of a dedicated power supply. In the illustrated example, energy scavenging system 43 includes a tap line connection 44 electrically coupled to one or more energy storage mechanism(s) 46, such as a rechargeable chemistry battery and/or a supercapacitor. Energy scavenging system 43 also includes a rotary reluctance generator 48 and an energy harvesting unit 50, which directs power produced by generator 48 into energy storage mechanism(s) 46 as appropriate. Additionally, in certain embodiments, generator 48 may also function as a rotational speed sensor. Energy harvesting unit 50, by comparison, provides input supply voltage regulation in embodiments to, for example, provide substantially constant charging current and voltage for charging one or more energy storage devices contained within energy storage mechanism(s) 46. An exemplary implementation of rotary reluctance generator 48 is further described below in conjunction with FIGS. 3-4. First, however, energy scavenging health monitor 12 is described in greater detail.

As further indicated in FIG. 2, ATSS 30 includes an SAV 52 and an ATS 54. SAV 52 may contain various components suitable for controlling airflow provided to ATS 54 during MES of an air-started GTE (not shown). For example, SAV 52 may include a valve element 56 (e.g., a butterfly valve plate), a valve actuator 58, and/or an SAV switch 60. During operation of ATSS 30, valve actuator 58 is commanded through SAV switch 60 to move valve element 56 between a fully open position, a fully closed position, and possibly any number of intermediate positions. The command signals supplied to SAV switch 60 may be transmitted over a connection 62 and provided by an engine controller, such as a FADEC, corresponding to controller 16 shown in FIG. 1. In one embodiment, and by way of non-limiting example only, a 24 volt electrical signal may be selectively applied to SAV switch 60 to move valve element 56 between open and closed positions. When airflow is provided from SAV 52 to ATS 54, the airflow drives rotation of an air turbine 64 contained within ATS 54. A drive train 66, which contains a toothed gear 68 (e.g., a gearwheel), mechanically connects ATS 54 to an output shaft of ATS 54 (not shown), which drives rotation of the spool or spools of a GTE through its AGB. As will be appreciated, various other components will also be included in ATS 54, but are not shown for illustrative clarity. A non-exhaustive lists of such components includes a (e.g., sprag) clutch, a lubrication system, airflow passages, plumbing features, and housing components, as generically represented by box 54 in FIG. 2. Both ATS 54 and SAV 52 are usefully (although not necessarily) implemented as avionic LRUs, which are bolted to pads on a AGB or otherwise mounted to the non-illustrated GTE.

With continued reference to FIG. 2, controller 34 can encompass or be associated with any suitable number of individual microprocessors, storage devices, interface cards, and other standardized components known in the field. Controller 34 may also include or cooperate with any number of firmware and software programs or instructions designed to carry-out the various process tasks, calculations, and data recording/processing functions described herein. Although illustrated as a separate block in FIG. 2, storage media or memory 36 may be integrated into controller 34 in certain embodiments as, for example, a system-in-package, a system-on-a-chip, or another type of microelectronic package or module. Memory 36 can encompass any number and type of storage media suitable for storing computer readable code or instructions, as well as other data utilized to support the operation of health monitor 12. Memory 36 can contain or consist of a solid state, non-volatile storage media, such as flash memory, in embodiments.

I/O interface 38 can include any number and type of interfaces permitting data transmission to and/or from health monitor 12, whether over physical or wireless connections. In one embodiment, I/O interface 38 includes a bus-connected port, such as a Universal Serial Bus (USB) or Joint Test Action Group (JTAG) port. Additionally or alternatively, in certain implementations of health monitor 12, I/O interface 38 may be imparted with wireless communication capabilities. In such embodiments, I/O interface 38 may contain a radiofrequency (RF) transceiver, such as an RFID (radio frequency identification) module enabling wireless communication over an Ultra High Frequency (UHF) bandwidth. For example, in one implementation, energy scavenging health monitor 12 may be utilized in conjunction with an RFID-enabled A/C containing a relatively large number of LRUs containing embedded RFID tags. Such an A/C may further include data concentrator or wireless gateways, which are distributed throughout the A/C and from, for example, a mesh network or other Local Area Network (LAN). Additionally or Alternatively, I/O interface 38 may also transmit data to an aircraft Wireless Server Unit (WSU), an engine Wireless Control Unit (WCU), or other device included within the wirelessly-connected aircraft architecture. In other embodiments, I/O interface 38 can selectively transmit data to an engine controller (e.g., controller 16 shown in FIG. 1)_ or another vehicular system, such as an Aircraft Communications Addressing and Reporting System (ACARS), to for example, schedule soft-time when a predetermined threshold associated with a component monitored by health monitor 12 is exceeded. Such wireless communication architectures are well-suited for extracting data recorded by health monitor 12 for separate storage and/or for processing to evaluate the health of SAV 52 and/or ATS 54.

Sensors 40, 42 can be configured to monitor various different operational parameters pertaining to SAV 52 and ATS 54. Many of these parameters are described in U.S. Pat. No. 9,507,982 B2, entitled "Line Replaceable Unit Health Nodes and Methods for Determining Maintenance Actions Relating to Line Replaceable Units," issued Nov. 29, 2016, assigned to the present Applicant (Honeywell International Inc.), and hereby incorporated by reference. When generated by health monitor 12, the health summary data ideally includes a relatively small set of data points (e.g., between one and a dozen data points), which are indicative of the overall condition or health of SAV 52, ATS 54, or other avionic component monitored by health monitor 12. With respect to ATS 54, specifically, the health summary data can include one or more of the following, as derived or determined from sensor signals provided by sensor 42 and/or generator 48: (i) the amount of time air turbine 64 operates over a particular rotational speed range, (ii) the cumulative cycle count of ATS 54, and/or (iii) the rotational speed of air turbine 64 as compared to the rotational speed of the ATS outlet shaft (when monitored). With respect to the rotational speed of air turbine 64, this may be determined by measuring the rotational speed of gear 68 utilizing generator 48 in the manner described below and by subsequent converting the speed of gear 68 to the rotational speed of turbine 64 utilizing a known conversion factor or gear ratio. Additionally, in embodiments in which controller 34 receives data from the engine controller (e.g., controller 16 shown in FIG. 1) indicative of the ATS command signals, the health summary may also include the ATS response time; that is, the elapsed time between issuance of the engine controller commands and the response by ATS 54.

With respect to SAV 52, the health summary data can include one or more of the following data points, as derived or determined from sensor signals provided by sensor 40: (i) the current rotational range and position of valve element 56, (ii) the current rate at which valve element 56 moves between fully open and closed positions, (iii) the cumulative time spent by valve element 56 in either the fully open or fully closed position, (iv) the cumulative number of operative cycles of valve element 56, and/or (v) the open or closed dead band of valve element 56 (that is, the offset between the excepted and actual position of valve element 56 when in the fully closed or opened position). Additionally or alternatively, energy harvesting health monitor 12 may record the duration of time SAV 52 remains operational and/or the operative cycles of SAV 52 based upon the command signals received at SAV switch 60, as detected by controller 34 via tap line connection 44. Again, energy harvesting health monitor 12 need not perform prognostic algorithms to generate top level health assessment in all instances; and, instead, may be utilized exclusively for data collection in at least some embodiments, in which case the health data collected by health monitor 12 can be extracted for diagnostic, prognostic, or fault analysis purposes.

The types of data described in the foregoing paragraph are provided by way of non-limiting example only. Regardless of the particular type or types of data tracked by energy harvesting health monitor 12, written into memory 36, and possibly processed by health monitor 12 to perform overall health assessments of SAV 52 and/or ATS 54, embodiments of energy scavenging health monitor 12 benefit from robust power harvesting mechanism and operational schemes. In certain embodiments, health monitor electronics 32 may be powered by scavenging power or command signals supplied to SAV switch 60 via tap line connection 44. Such scavenged power may be stored in energy storage mechanism(s) 46 and can be utilized to support operations following cessation of power supply to switch 60. In this case, energy storage mechanism(s) 46 may contain or consistent of a short term energy storage mechanism, such as one or more capacitors. Such an approach is useful when it is desired to commence operation of health monitor 12 in conjunction with opening of SAV 52, while the power stored within mechanism(s) 46 can be drawn down to complete the appropriate read, write, and processing tasks described herein. To allow immediate start of energy scavenging health monitor electronics 32 in conjunction with activation of ATSS 30, energy scavenging system 43 may also contain a long term energy storage mechanism in at least some embodiments. The energy charged into such a long term energy storage mechanism in the previous run or active iteration of health monitor 12 can thus be utilized to support the initial power up when, for example, the energy harvested form the rotational movement of the driven component 20 is insufficient to adequately power the health monitor electronics; e.g., as may be the case when the below-described gear 68 turns at a relatively low rotational rate during the initial stages of MES.

In addition to or in lieu of diverting power from SAV switch 60 via tap line connection 44, energy scavenging health monitor electronics 32 may also be powered utilizing energy harvested by generator 48, which draws power from motion of a driven component contained within ATSS 30. In this regard, generator 48 may harvest power from a toothed gear 68 mechanically coupled to air turbine 64; e.g., toothed gear 68 may be a gearwheel contained within drive train 66 of ATS 54. As generically indicated in FIG. 2, generator 48 may be installed in a port 70 provided in the housing of ATS 54; the term "port" encompassing both dedicated ports present in the ATS housing or chassis following original manufacture, as well as modification ports or bores created in the ATS housing as retrofit modifications performed post original manufacture. Generator 48 may assume various forms suitable for harvesting power from rotation of gear 68. In one embodiment, generator 48 is realized as a rotary reluctance generator, which may also be utilized as a speed sensor for monitoring the rotational rate of gear 68 and, therefore, air turbine 64. In such embodiments, the harvesting and sensing element of generator 48 installed may be installed in the ATS housing in manner enabling the detection of the motion of gear teeth through, for example, changes in a magnetic flux. An exemplary embodiment of such a rotary reluctance generator will now be described in conjunction with FIGS. 3 and 4.

Figure 3:
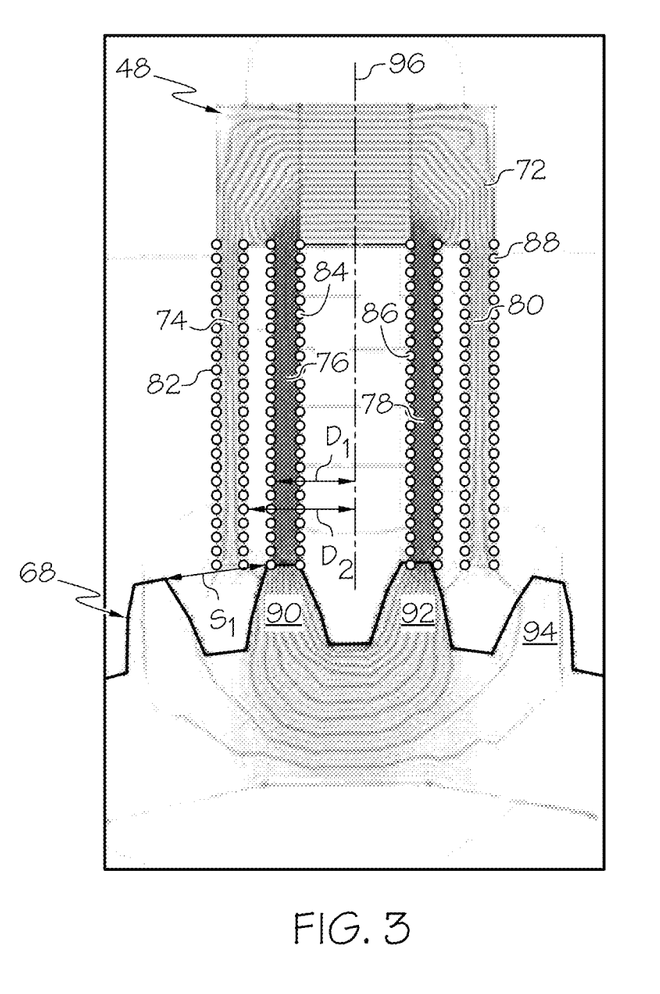
FIGS. 3 and 4 are cross-sectional views of a toothed gear (e.g., a gearwheel contained in an ATS) and a rotary reluctance generator, which may be included in the energy scavenging health monitor shown in FIG. 2 in at least some embodiments and which is illustrated to include simulated flux lines.
Figure 4:
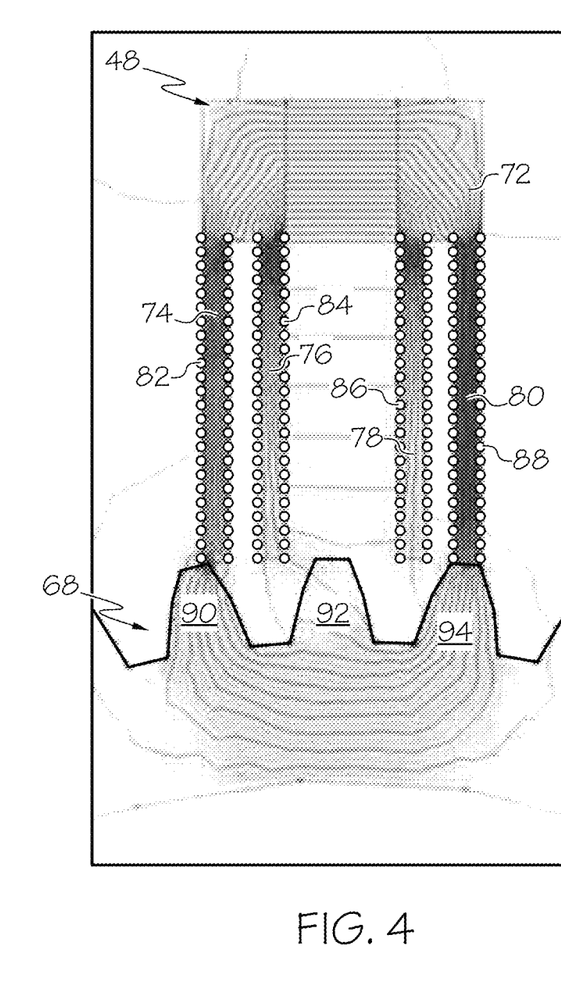

FIGS. 3 and 4 are cross-sectional views providing a more detailed depiction of toothed gear 68 and rotary reluctance generator 48 in an exemplary embodiment. Simulated flux lines are also shown in FIGS. 3-4 to better illustrate the operational principal of rotary reluctance generator 48. Here, it can be seen that that rotary reluctance generator 48 contains a body 72 from which a plurality of elongated fingers or coil cores 74, 76, 78, 80 extend. Coil cores 74, 76, 78, 80 are composed of a magnetically permeable material are which electromagnetic coils 82, 84, 86, 88, respectively, wrap or are wound. Coil cores 74, 76, 78, 80 are positioned to form varying flux circuits, which are closed between two different pairs of coil cores as toothed gear 68 rotates; e.g., as described below coil cores 74, 76, 78, 80 may be positioned in a linear array or row having a varied core-to-core spacing. This may be appreciated by comparing the locations of gear teeth 90, 92, 94 relative to the adjacent terminal ends of coil cores 74, 76, 78, 80 in FIG. 3 and FIG. 4. Stated differently, rotary reluctance generator 48 is positioned adjacent an outer periphery of gear 68 such that the terminal ends of coil cores 74, 76, 78, 80 are located radially the gear teeth.

As can be seen in FIG. 3, gear 68 is in a first rotational position in which the distal tip portions of gear teeth 90, 92 (that is, the ends of teeth 90, 92 located further from body 72) are located radially adjacent the terminal ends of inner coil core pair 76, 78; and, thus, complete the flux circuit allowing relative low reluctance flow of magnetic lines from electromagnetic coils 84, 86, through gear teeth 90, 92 and the body of gear 68. The inner flux circuit may thus be described as closed, while the outer flux circuit remains open. Comparatively, in the position shown in FIG. 4, gear 68 has rotated slightly a counterclockwise direction such that gear teeth 90, 94 are located radially adjacent outer coil core pair 74, 80. Consequently, the outer flux circuit is now closed, while the inner flux circuit is opened. Magnetic flux is consequently permitted to flow with little reluctance from electromagnetic coils 82, 88, through gear teeth 90, 94, and through the body of gear 68. Thus, generally stated, coil cores 74, 76, 78, 80 and electromagnetic coils 82, 84, 86, 88, cooperate to form multiple flux circuits, which alternate between open and closed states as gear 68 rotates relative to rotary reluctance generator 48.

As labeled in FIG. 3, the tip-to-tip gear tooth spacing is identified by double-headed arrow $S_1$. The spacing between inner cores 76, 78 and the centerline of rotary reluctance generator 48 (represented by dashed line 96) is identified by double headed arrow $D_1$. Finally, the spacing between outer cores 74, 80 and generator centerline 96 is identified by double headed arrow $D_2$. In the illustrated example, rotary reluctance generator 48 is substantially bilaterally symmetrical taken along centerline 96, while coil cores coil cores 74, 76, 78, 80 are spaced in a row taken along a lateral axis of generator 48 perpendicular to centerline 96. Specifically, in the illustrated example, coil cores 74, 76, 78, 80 are laterally spaced such that $D_1 < S_1 < D_2$, thereby achieving the desired alternation in flux circuit activation described above. In further embodiments, generator 48 may have a different number of cores or a different structural configuration, providing that rotary reluctance generator 48 is capable of harvesting energy through varying activation of flux circuits as gear 68 rotates. For example, it is possible for rotary reluctance generator 48 to be imparted with three fingers of varied lateral spacing such that, in varying gear positions, different pairs of fingers combine to form differing flux circuits. In still other embodiments, generator 48 may harvest power from a different rotating component, such as a splined shaft, providing such a component is imparted with regions of varying material, magnets (e.g. permanent magnets and pole pieces), or otherwise has regions of varying permeability through which the operative principal described above can be implemented.

Referring briefly once again to FIG. 2, memory 36 may store computer-readable instructions or code that, when executed by controller 34, cause energy scavenging health monitor 12 to perform certain operations. Such operations can relate to the manner in which data pertaining to SAV 52 and/or ATS 54 is collected and possibly processed for diagnostic and prognostic purposes. Additionally, such operations may dictate the particular manner in which energy harvesting health monitor 12 draws and uses power at a given juncture during a given iteration of the algorithms or processes carried-out by controller 34. For example, in certain embodiments, controller 34 and, more generally, energy harvesting health monitor 12 may be operable in at least two modes: a startup mode and an extended operation mode. In one embodiment, health monitor 12 may initially operate in a startup mode in response to a predetermined trigger event. The trigger event can be, for example, activation of ATS 54 as determined by signals received from sensor 42 or generator 48 indicative of rotation of gearwheel 68. Alternatively, the trigger event may be the receipt of a particular command signal at SAV 52, such as an VALVE OPEN signal received by switch 60 and detected utilizing tap line connection 44. Still other trigger events may be utilized in further embodiments of energy scavenging health monitor 12, such as excursion events when one or more operational parameters of ATSS 30 exceeds a predetermined threshold value.

After detection of the trigger event, energy harvesting health monitor 12 may initially operate in the startup mode. During the startup mode, health monitor 12 may be powered primarily or exclusively utilizing power diverted from the command signal supplied to SAV switch 60 via tap line connection 44. Afterwards, energy harvesting health monitor 12 may transition to the extended operational mode due to elapse of a predetermined time period, cessation of the command signal or power supply to SAV switch 60, or in response to occurrence of another predefined condition. When operating in the extended operational mode, energy harvesting health monitor 12 may be primarily or exclusively powered via energy drawn from energy storage mechanism(s) 46. This approach provides a number of advantages. First, diverting power from the electrical input of switch 60 in this manner ensures rapid startup of energy harvesting health monitor 12, which, in turn, helps ensure timely data collection. This is useful in that, if relying exclusively on a battery contained within energy storage mechanism 46 for power supply, energy harvesting health monitor 12 may fail to initiate operation in a timely manner in instances in which the energy content of the battery is low (e.g., due to power loss or dissipation over prolonged periods of inactivity), which can, in turn, result in incomplete data collection resulting in misdiagnosis of the health states of the monitored components. Second, the above-described biphasic approach ensures that adequate power remains after cessation of power supply to switch 60 for health monitor 12 to complete any desired processing and storage tasks, as previously described.

There has thus been described embodiments of energy harvesting health monitors, which gather data pertaining to one or more monitored devices onboard a vehicle. The data gathered by the energy harvesting health monitors can then be processed to carry-out prognostic algorithms utilized to evaluate component health, whether by the energy harvesting health monitor itself or by another system, device, or module in communication with the health monitor. In certain embodiments, the energy harvesting monitor can include a rotary reluctance generator, which may also function of as a rotary speed sensor. Energy harvesting may be accomplished utilizing such a rotary reluctance monitor or another device, which derives power from a driven component contained within the monitored device or otherwise deployed onboard the vehicle. Additionally or alternatively, the energy harvesting health monitor may divert power supplied to the monitored device in the form of, for example, command signals. In this latter regard, embodiments of the health monitor may divert power from the open/closed signal transmitted to an SAV contained an ATSS for energy scavenging purposes and/or to determine when to initiate data collection and possibly processing of sensor signals pertaining to the SAV and/or an ATS contained in the ATSS. Regardless of the particular types of components and data points tracked by the health monitor, the above-described health monitors achieve a level of power independence, which mitigate complications during integration and can lessen undesired impacts to other systems onboard a particular vehicle or A/C. Further, when utilized onboard an A/C, the power independent of the energy scavenging health monitor may help simplify any requested qualification procedures to facilitate market adoption by offering customers health tracking and diagnostic solutions requiring little to no modifications to other A/C components.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set forth in the appended Claims.

What is claimed is:

1. An energy scavenging health monitor for usage onboard a vehicle, the energy scavenging health monitor comprising:
   an energy scavenger system;
   a controller coupled to the energy scavenger system;
   a first sensor coupled to the controller and configured to provide thereto sensor signals indicative of an operational parameter pertaining to a monitored device of the vehicle, the monitored device containing a switch; and
   storage media containing computer-readable instructions that, when executed by the controller, cause the energy scavenging health monitor to perform the operations of:
      determining when a predetermined trigger event has occurred based, at least in part, on electrical signals received from the energy scavenger system; and
      when determining that the predetermined trigger event has occurred, storing data derived from sensor signals in the storage media,
   wherein the energy scavenger system comprises:
      an electrical tap line connection coupled to an electrical input of the switch and configured to extract energy from command signals applied thereto; and
      an energy storage mechanism coupled to the electrical tap line connection and configured to store the energy extracted by the tap line connection.

2. The energy scavenging health monitor of claim 1 wherein the energy scavenging system further comprises:
   a generator coupled to the energy storage mechanism and configured to convert motion of a driven component of the vehicle into energy stored within the energy storage mechanism.

3. The energy scavenging health monitor of claim 2 wherein the generator comprises a rotary reluctance generator configured to convert rotation of the driven component into energy stored within the energy storage mechanism.

4. The energy scavenging health monitor of claim 3 wherein the driven component comprises a gearwheel; and
   wherein the rotary reluctance generator comprises:
      a plurality of elongated cores having terminal ends positioned adjacent an outer peripheral portion of the gearwheel; and
      a plurality of electromagnetic coils wound around the plurality of elongated cores and cooperating therewith to form multiple flux circuits, which alternate between open and closed states as the gearwheel rotates relative to the rotary reluctance generator.

5. The energy scavenging health monitor of claim 3 wherein the computer-readable instructions that, when executed by the controller, further cause the energy scavenging health monitor to perform the operation of:
   detecting rotational speeds of the driven component based upon electrical signals received from rotary reluctance generator; and
   storing data indicative of the detected rotational speeds in the storage media.

6. The energy scavenging health monitor of claim 5 wherein the energy scavenging system further comprises a tap line connection electrically coupled to an electrical input of the monitored device and configured to extract energy from electrical signals transmitted to the monitored device.

7. The energy scavenging health monitor of claim 6 wherein the computer-readable instructions that, when executed by the controller, further cause the energy scavenging health monitor to perform the operation of:
   in response to receipt of a predetermined signal at the electrical input of the monitored device, initially operate in a startup mode during which the energy scavenging health monitor is primarily powered via energy extracted from the predetermined signal; and
   after initially operating in the startup mode, transition to an extended operation mode during which the energy scavenging health monitor is primarily powered via energy supplied by the energy storage mechanism.

8. The energy scavenging health monitor of claim 3 wherein the driven component comprises a gearwheel located within an air turbine starter having a housing; and
   wherein the rotary reluctance generator is installed within a port in the housing of the air turbine starter.

9. The energy scavenging health monitor of claim 1 wherein the monitored device comprises a starter air valve.

10. The energy scavenging health monitor of claim 9 wherein the predetermined trigger event comprises receipt of an open command signal at the electrical input of the switch.

11. The energy scavenging health monitor of claim 9 wherein the predetermined trigger event comprises activation of the monitored device, as detected by the energy scavenger system.

12. A method performed by an energy scavenging health monitor containing a controller, a memory, and a rotary reluctance generator, the method comprising:
   harvesting energy from a rotating component of an air turbine starter utilizing the rotary reluctance generator;
   at the controller, processing signals received from the rotary reluctance generator to detect rotational speeds of the rotating component;
   storing data in the memory indicative of the detected rotational speeds of the rotating component;
   extracting energy from command signals supplied to a switch of a starter air valve fluidly coupled to the air turbine starter; and
   utilizing the extracted energy in powering the energy scavenging health monitor.

13. The method of claim 12 further comprising:
   storing the energy harvested from the rotating component in an energy storage mechanism further contained in the energy scavenging health monitor;
   powering the energy scavenging health monitor primarily utilizing energy extracted from the command signals during an initial startup phase of the energy scavenging health monitor; and
   after the initial startup phase of the energy scavenging health monitor, transitioning to powering the energy scavenging health monitor primarily utilizing energy supplied by the energy storage mechanism.

14. An energy scavenging health monitor for usage onboard a vehicle, the energy scavenging health monitor comprising:
   a controller;
   a first sensor coupled to the controller and configured to provide thereto sensor signals indicative of an operational parameter pertaining to a monitored device of the vehicle; and
   an energy scavenger system coupled to the controller, the energy scavenger system comprising (i) an energy storage mechanism, (ii) a rotary reluctance generator coupled to the energy storage mechanism and configured to convert rotation of the driven component into energy stored within the energy storage mechanism, and (iii) a tap line connection electrically coupled to an electrical input of the monitored device and configured to extract energy from electrical signals transmitted to the monitored device; and storage media containing computer-readable instructions that, when executed by the controller, cause the energy scavenging health monitor to perform the operations of:

determining when a predetermined trigger event has occurred based, at least in part, on electrical signals received from the energy scavenger system;

when determining that the predetermined trigger event has occurred, storing data derived from sensor signals in the storage media;

detecting rotational speeds of the driven component based upon electrical signals received from rotary reluctance generator;

storing data indicative of the detected rotational speeds in the storage media;

in response to receipt of a predetermined signal at the electrical input of the monitored device, initially operate in a startup mode during which the energy scavenging health monitor is primarily powered via energy extracted from the predetermined signal; and after initially operating in the startup mode, transition to an extended operation mode during which the energy scavenging health monitor is primarily powered via energy supplied by the energy storage mechanism.

* * * * *